Nov. 5, 1935.  L. CONSTANTIN  2,020,105
AUTOMATIC PILOTING DEVICE
Filed Sept. 15, 1934   3 Sheets-Sheet 1
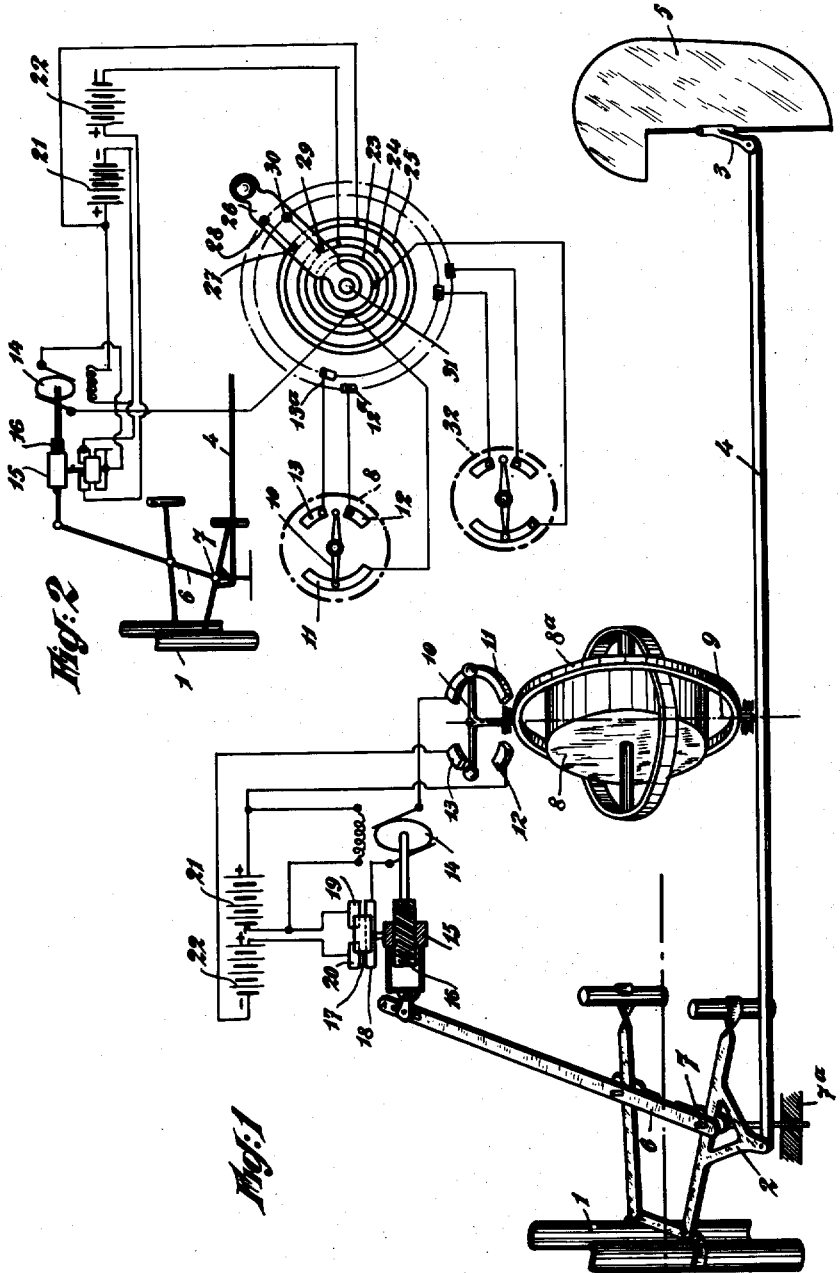
Inventor
Louis Constantin
By Mauro & Lewis
attorneys

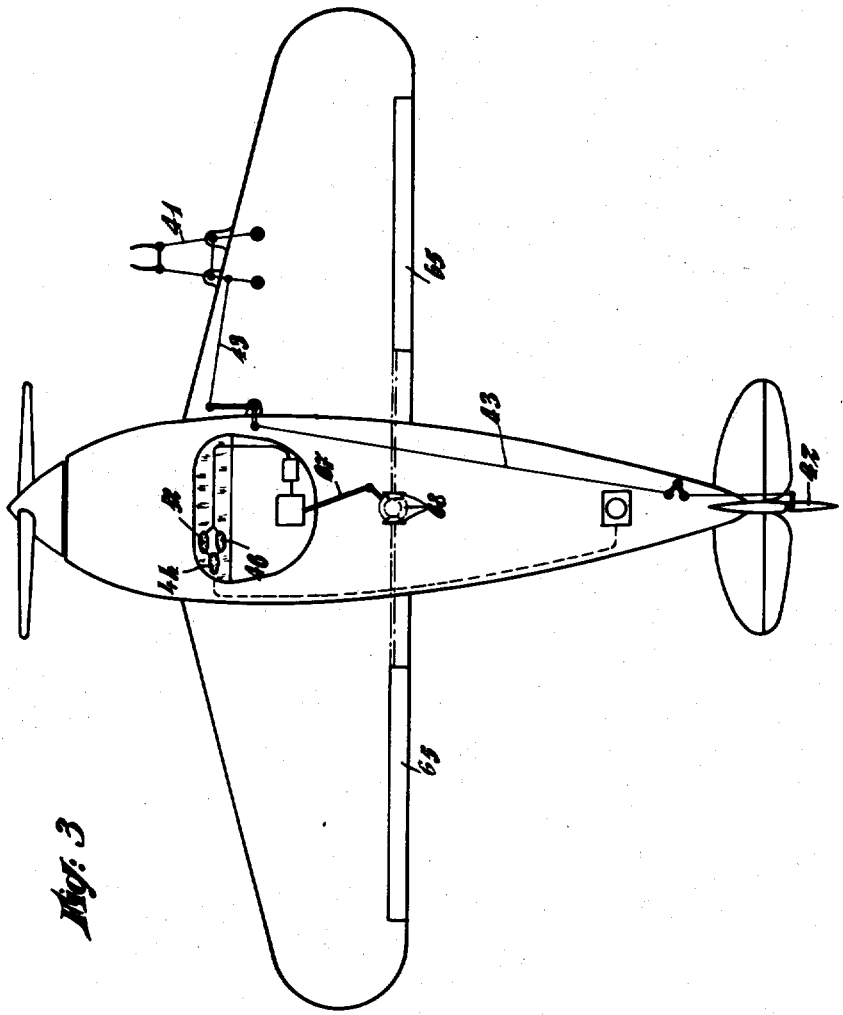

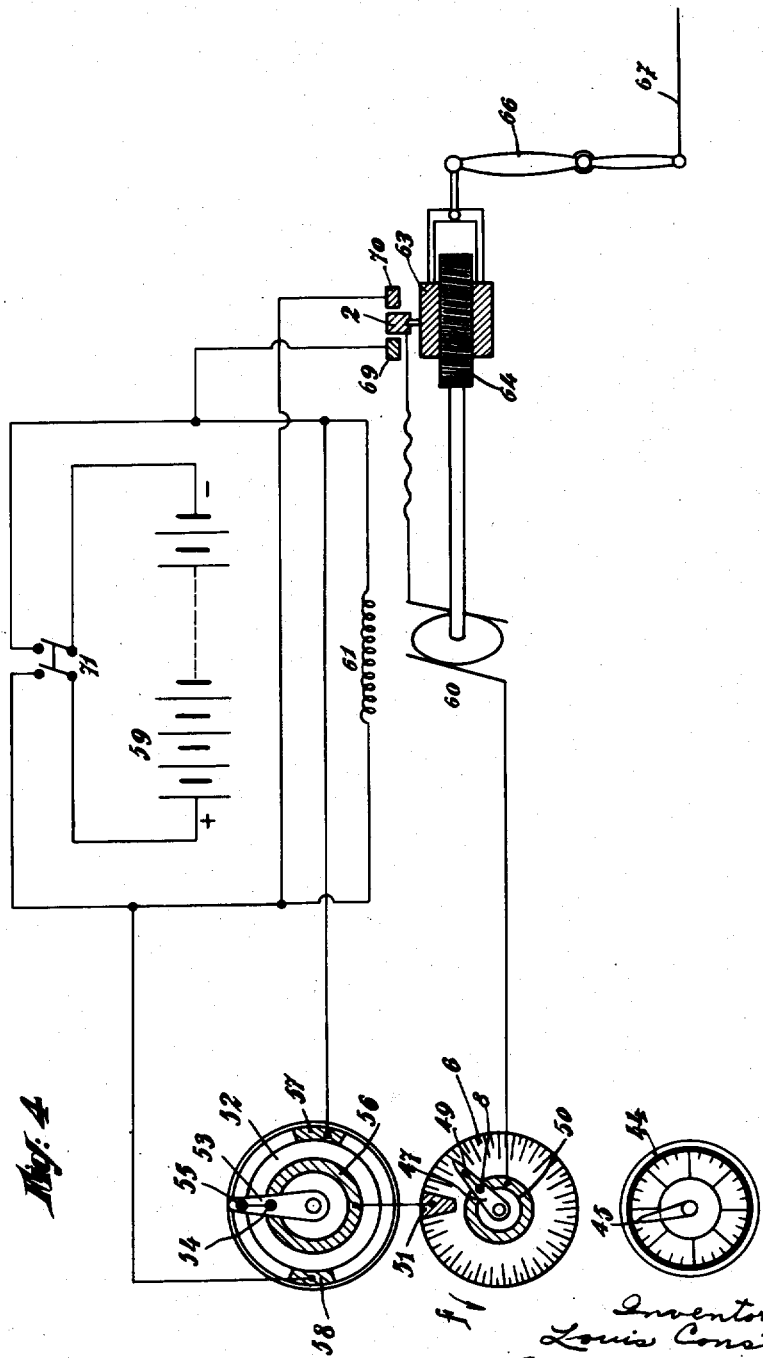

Patented Nov. 5, 1935

2,020,105

UNITED STATES PATENT OFFICE 2,020,105

AUTOMATIC PILOTING DEVICE

Louis Constantin, Paris, France

Application September 15, 1934, Serial No. 744,253
In France September 19, 1933

7 Claims. (Cl. 244—29)

The object of the present invention is to provide an automatic piloting device capable of both automatically righting the airplane laterally about its fore and aft axis and keeping said airplane on the desired course, said device being applicable also to airships, submarines and torpedoes.

The device according to the present invention is characterized by the combination of a wind-vane, preferably a balanced wind-vane, for instance of the Constantin type, adapted automatically to right the airplane laterally about its fore and aft axis and controlling either the rudder or the ailerons, with means, themselves controlled by any guiding apparatus (radio-compass, tele-compass, etc.), for producing successive alternating lateral dissymmetries of the airplane, such as a dissymmetry of the wind-vane with respect to the airplane, a dissymmetrical position of the ailerons, the increase or the reduction of one wing slot, the increase or the reduction of the lateral resistance on one side, a displacement of the gas throttle of one lateral engine in a multi-engined plane, etc. But said means do not act directly on the rudder for correcting instantaneous modifications of the course, the dissymmetry thus produced being maintained until a certain angle of the fore and aft axis of the airplane with the correct course has been reached and being then replaced by a dissymmetry in the opposite direction.

Furthermore these alternating dissymmetries always remain equal to themselves on either side of the median plane of the airplane and their value remains wholly independent of the quantitative importance of the deviations from the correct course that are to be corrected.

Every time it has been desired to automatically maintain a vehicle moving in a fluid on a given course, the rudder of this vehicle was directly subjected to the action of a guiding apparatus, such for instance as a gyroscope, directly opposing any instantaneous variation of the course and acting quantitatively as a function of the importance of these variations.

There is another way of obtaining the same result. It suffices to provide a wind-vane, preferably a Constantin wind-vane, for automatically righting of the airplane laterally about its fore and aft axis and to cause the mean course of the airplane to be deflected in the proper direction by producing successive and alternating slight lateral dissymmetries of a uniform value of the airplane structure about its longitudinal plane of symmetry. These dissymmetries will be controlled by the guiding apparatus and will be maintained, without any direct action of the rudder, as long as it will be necessary.

The correct position will be overreached every time and this will result in producing a series of alternating variations of the true course of the airplane on either side of the mean course thereof which, in point of fact, is the desired course, without the stability of the airplane being impaired, owing to the correcting action of the wind-vane.

Preferred embodiments of the present invention will be hereinafter described with reference to the accompanying drawings, given merely by way of example, and in which:

Fig. 1 is a diagrammatical view of a device according to the present invention;

Fig. 2 shows a switch device which makes it possible to pass from a directing system to another one;

Fig. 3 relates to a modification and diagrammatically shows an airplane fitted with this modification;

Fig. 4 is a detail view of this modification.

In the embodiment of Fig. 1, a Constantin wind-vane 1 acts on the rudder 5 through levers 2 and 3 and connecting rod 4. It thus rights the airplane laterally about its fore and aft axis, but at the cost of some deviations from the course. But as the mean course is always substantially at right angles to the side 6 of the trapezoidal structure that constitutes one of the parts of the wind-vane, it shall suffice to suitably control the position of this side 6 for correcting all these deviations when they take place.

For this purpose, the axis of articulation 7 is pivotally mounted in a journal 7ª rigid with the airplane and the side 6 of the jointed trapezoidal structure of the wind-vane is prolonged and operatively connected with the device that will be hereinafter described.

A gyroscope 8 for instance, the support 8ª of which is capable of oscillating about vertical axis 9, is adapted to bring into electrical connection, through lever 10, contact 11 with either of contacts 12 and 13. Contact 11 is electrically connected with one of the brushes of an independent excitation direct current motor 14. Contact 12 is connected with the positive terminal of a first battery of accumulators 21 and contact 13 is connected with the negative terminal of a second battery of accumulators 22.

On the other hand, motor 14, when rotating in one direction or the opposite one, causes a nut 15 to move forward or backward through the intermediary of an endless screw 16. This nut itself controls, on the one hand the lever 6 of the wind-vane, and, on the other hand a brush 16 which is capable of bringing into electrical connection contact 18 connected with the other terminal of the motor either with contact 19 connected with the negative terminal of battery 21 or with contact 20 connected with the positive terminal of battery 22, or again with both of these contacts 19 and 20 simultaneously.

This device works in the following manner:

As long as the organs are in the respective positions shown in Fig. 1, motor 14 which is not fed with electric current remains stationary. If the airplane turns through a certain angle with respect to its initial course, as the plane of the gyroscope remains stationary lever 10 brings contact 11 into electrical connection for instance with contact 13, that is to say with the negative terminal of battery 22. Obviously, motor 14 will now be fed with electric current and it will start running, causing nut 15 to move, for instance toward the right hand side, and displacing element 6 of the wind-vane. The latter will therefore perform the correction of the course, bringing back the airplane into its initial direction by progressively deflecting its trajectory in the desired direction. On the other hand, brush 17, being moved toward the right hand side, will leave contact 20 and when element 6 shall have been moved through a predetermined angle the current will be switched off and the motor will stop. However, the correction performed by the wind-vane will remain effective until the airplane is back into its initial position with respect to the gyroscope. As the airplane will move beyond this position, motor 14 will be started running in the opposite direction owing to the electrical connection that will take place between contact 11 and contact 12. The airplane will thus describe, on either side of its mean course, oscillations the amplitude of which will depend on the angular distance between contacts 12 and 13 and on the maximum angular displacement of lever 6. These values can be so chosen that the airplane may be maintained on its course with a maximum deviation of say one or two degrees, that is to say more accurately than could be obtained with the best pilot.

In the preceding description, it has been assumed that the directing or guiding organ was a gyroscope. But of course many other directing organs might be employed, such as a telecompass, a radio-compass, a radio electric beacon, an electro-magnetic cable, etc.

Besides it may be advantageous to guide the airplane on the correct course by means of several directing organs employed successively.

For this purpose I may make use of a switch.

Three conducting rings 23, 24 and 25 (Fig. 2) are electrically connected with one of the terminals of motor 14, the negative terminal of battery 22 and the positive terminal of battery 21 respectively. Two contacts 12ª and 13ª, disposed concentrically and at the proper interval, are electrically connected with contacts 12 and 13 of Fig. 1, which in Fig. 2 are shown in plan view, respectively. An insulating support 26, capable of turning about axis 31, carries four brushes 27, 28, 29 and 30 electrically connected two by two. Brushes 27 and 29 slide along rings 24 and 25 while brushes 28 and 30 slide along contacts 12ª and 13ª. Under these conditions, the airplane will be controlled by gyroscope 8, as above explained with reference to Fig. 1. A system such as that surrounded by the dotted lines circle 32 may be connected with a radio-compass, another one with an electro-magnetic radio-compass, etc. The shifting from one guiding system to another one will be obtained by merely operating the switch.

In the modification of the automatic piloting apparatus shown in Figs. 3 and 4, the Constantin wind-vane 41 controls the rudder 42 of the airplane through a transmission 43. It is known that it thus maintains lateral equilibrium by preventing sideslipping. On the other hand, 44 is a telecompass repeating dial and pointer 45 constantly indicates the magnetic north. 46 is another repeating dial, but which has the following characteristics: Pointer 47, which is connected with pointer 45 through a flexible shaft or any other transmission, not shown in the drawings, and which rotates at the same rate as pointer 45, can be fixed on its shaft so as to make any desired angle with this pointer 45. This pointer 47 further carries two brushes 48 and 49 electrically connected together so as to be capable of electrically connecting a stationary circular contact 50 with contact 51, disposed in the fore and aft plane of the airplane. The third dial 52 carries a pointer 53 which is caused by a mechanical device, not shown in the drawings, to turn for instance 90 times quicker than pointer 47. This pointer 53 carries two brushes 54 and 55 electrically connected together and adapted to connect together circular contact 56, itself constantly connected with contact 51, with either of contacts 57 and 58. Furthermore, this pointer 53 can always be brought back to the zero position shown in Fig. 4, by being suitably keyed on its axis. Contact 57 is electrically connected with the negative terminal of battery 59 and contact 58 is electrically connected with the positive terminal of the same battery.

A direct current electric motor 60 having a separate excitation element 61 is connected on the one hand with contact 56 and on the other hand with brush 62, which is itself rigid with nut 63, driven by motor 60 through the medium of endless screw 64. Nut 63 controls the position of the ailerons 65 through lever 66, connecting rod 67 and bevel gears 68. Finally, two contacts 69 and 70 are electrically connected with the respective positive and negative terminals of battery 59.

A circuit breaker 71 serves to disconnect the battery.

The device above described operates in the following manner:

Let it be supposed that it be desired to follow a course making an angle of 45° on the east side of the magnetic meridian. Pointer 47 will be fixed in a position making an angle of 45° with respect to pointer 45 on the east side thereof and circuit breaker 71 will be closed. Of course motor 60 remains stationary. But, as it will be hereinafter explained, brush 62 is already either on contact 69 or on contact 70. It will be assumed that brush 62 is on contact 70. The ailerons are then in a position that corresponds to the airplane being caused to turn and if this turn is on the right hand side, pointer 47 will soon come upon contact 51. When pointer 47 is on the middle point of this contact 51, pointer 53 is brought into the zero position. The airplane will keep turning until pointer 53 comes upon contact 58. The circuit of the motor is now closed and the motor is started. Brush 62 will soon leave contact 69 and come upon contact 70. This cuts off the circuit of the motor which is short circuited and will stop after having however run on for a short time due to inertia.

But the direction in which the airplane turns now changes and the airplane keeps turning in the opposite direction until pointer 53 comes upon contact 57, which will reverse the direction of running of the motor. These operations will be repeated indefinitely.

Of course these successive curves described by the airplane may be of a great radius and the airplane will move along an undulated trajectory the mean line of which is the desired course, defined by the angle between pointers 47 and 45.

If it is desired to change the course, it suffices to open circuit breaker 71 and to modify the angle between pointers 47 and 45, after which circuit breaker 71 is again closed. This will cause the airplane to turn until it is in the proper direction. Pointer 53 is brought back into the zero position at the right time and the trajectory of the airplane will resume its slow oscillations on either side of the desired direction.

By suitably choosing the dimensions of contacts 51, 57 and 58, it will be possible to obtain the most advantageous amplitude for these oscillations.

Pointer 45 may be a part of any known guiding apparatus (telecompass, gyroscope, radio-compass, etc.) provided with a repeater.

What I claim is:

1. An automatic piloting system for a craft moving in a fluid, which comprises, in combination, at least one control surface movably carried by said craft for steering it, a wind-vane operative by reaction of said fluid thereon to actuate said control surface for automatically righting said craft laterally about its fore and aft axis, means for producing successive and opposite dissymmetries of said craft with reference to its longitudinal plane of symmetry, and means for reversing the dissymmetry whenever the angle of said longitudinal plane with a predetermined course equals a given value.

2. An automatic piloting system for an airplane, which comprises, in combination, a rudder for steering said airplane, a wind-vane operative by reaction of the relative wind thereon to actuate said rudder for automatically righting said airplane laterally about its fore and aft axis, means for producing successive and opposite equal dissymmetries of said airplane with reference to its longitudinal plane of symmetry, and means for reversing the dissymmetry whenever the angle of said longitudinal plane with a predetermined course equals a given value.

3. An automatic piloting system for an airplane, which comprises, in combination, a rudder for steering said airplane, a wind-vane operative by reaction of the relative wind thereon to actuate said rudder for automatically righting said airplane laterally about its fore and aft axis, means for producing equal and opposite successive dissymmetries of the structure of said airplane with reference to its longitudinal plane of symmetry, a servo-motor for operating the last mentioned means, means for automatically starting said servo-motor for a time sufficient for operating said last mentioned means whenever the angle of said longitudinal plane of symmetry with a given course becomes equal to a predetermined value, and means, operative by said servo-motor, for reversing the direction of running of said servo-motor at the end of each period of running thereof in either direction.

4. An automatic piloting system for an airplane, which comprises, in combination, a rudder for steering said airplane, a wind-vane operative by reaction of the relative wind thereon to actuate said rudder for automatically righting said airplane laterally about its fore and aft axis, means for producing equal and opposite successive dissymmetries of the structure of said airplane with reference to its longitudinal plane of symmetry, a reversible electric servo-motor for operating the last mentioned means, means for automatically closing the circuit of said servo-motor for a time sufficient for operating said last mentioned means whenever the angle of said longitudinal plane of symmetry with a given course becomes equal to a predetermined value, and a switch operative by said servo-motor for reversing the direction of the current flowing through said electric motor at the end of each period of running thereof in either direction.

5. An automatic piloting system for an airplane, which comprises, in combination, a rudder for steering said airplane, a wind-vane operative by reaction of the relative wind thereon to actuate said rudder for automatically righting said airplane laterally about its fore and aft axis, means for producing equal and opposite successive dissymmetries of the structure of said airplane with respect to its longitudinal plane of symmetry, a servo-motor for operating the last mentioned means, an apparatus, including at least one element capable of remaining constantly in the same relative position with respect to a given course, for automatically starting said servo-motor for a time sufficient for operating said last mentioned means whenever the angle between said element and said plane of symmetry of the airplane becomes equal to a predetermined value, and means, operative by said servo-motor, for reversing the direction of running of said motor at the end of each period of working thereof in either direction.

6. An automatic piloting system for an airplane, which comprises, in combination, a rudder for steering said airplane, a wind-vane operative by reaction of the relative wind thereon to actuate said rudder for automatically righting said airplane laterally about its fore and aft axis, means for producing equal and opposite successive dissymmetries of the structure of said airplane with respect to its longitudinal plane of symmetry, a servo-motor for operating the last mentioned means, a plurality of apparatus, including each one element capable of remaining constantly in the same relative position with respect to a given course, each adapted to automatically start said servo-motor for a time sufficient for operating said last mentioned means whenever the angle between said element and said plane of symmetry of the airplane becomes equal to a predetermined value, switching means for connecting either of these apparatus with said motor, and means, operative by said servo-motor, for reversing the direction of running of said servo-motor at the end of each period of working thereof in either direction.

7. An automatic piloting system for an airplane, which comprises, in combination, a rudder for steering said airplane, a wind-vane operative by reaction of the relative wind thereon to actuate said rudder for automatically righting said airplane laterally about its fore and aft axis, means for producing equal and opposite successive dissymmetries of the structure of said airplane with reference to its longitudinal plane of symmetry, a servo-motor for operating the last mentioned means, a first pointer capable of remaining constantly in the same relative position with respect to a given course, a second pointer operatively connected with the first mentioned one so as to rotate together with it but so arranged that its relative position with respect to said first mentioned pointer can be modified, a third pointer, operatively connected with the second mentioned one so as to rotate at a higher angular speed, contacts adapted to cooperate with the second and third pointers so as to automatically start said servo-motor for a time sufficient for operating said last mentioned means whenever the angle between said element and said plane of symmetry of the airplane becomes equal equal to a predetermined value, and means, operative by said servo-motor, for reversing the direction of running of said motor at the end of each period of working thereof in either direction.

LOUIS CONSTANTIN.